United States Patent [19]

Gordon et al.

[11] Patent Number: 4,762,395
[45] Date of Patent: Aug. 9, 1988

[54] LENS ASSEMBLY FOR OPTICAL COUPLING WITH A SEMICONDUCTOR LASER

[75] Inventors: Eugene I. Gordon, Convent Station, N.J.; Robert J. Nielsen, Upper Black Eddy, Pa.; John W. Stafford, Summit, N.J.

[73] Assignee: AMP Incorporated, Harrisburg, Pa.

[21] Appl. No.: 150,481

[22] Filed: Jan. 29, 1988

Related U.S. Application Data

[63] Continuation of Ser. No. 902,999, Sep. 2, 1986, abandoned.

[51] Int. Cl.⁴ ............................................. G02B 7/02
[52] U.S. Cl. .................................. 350/252; 350/253; 350/96.20
[58] Field of Search ............... 350/252, 253, 255, 247, 350/257, 96.18, 96.20

[56] References Cited

U.S. PATENT DOCUMENTS

| | | | |
|---|---|---|---|
| 2,908,209 | 10/1959 | Marvin et al. | 350/255 |
| 3,671,108 | 6/1972 | Kilgus | 350/253 |
| 3,813,169 | 5/1974 | Kaestner | 356/153 X |
| 3,840,889 | 10/1974 | O'Brien et al. | |
| 3,894,789 | 7/1975 | Kobayashi et al. | 350/96.18 |
| 3,938,895 | 2/1976 | Bridger et al. | 356/153 X |
| 3,954,338 | 5/1976 | Hennel et al. | 356/153 X |
| 4,003,074 | 1/1977 | Yonezu et al. | |
| 4,060,309 | 11/1977 | Le Noane et al. | 350/96.18 |
| 4,166,668 | 9/1979 | MacLeod | 350/96.20 |
| 4,168,883 | 9/1979 | MacLeod | 350/96.20 |
| 4,199,222 | 4/1980 | Ikushima et al. | 350/96.18 X |
| 4,257,672 | 3/1981 | Balliet | 350/96.18 X |
| 4,281,891 | 8/1981 | Shinohara et al. | 350/96.18 X |
| 4,296,998 | 10/1981 | Dufft | 350/96.20 |
| 4,307,934 | 12/1981 | Palmer | 350/96.20 |
| 4,307,951 | 12/1981 | Saito et al. | 350/255 |
| 4,316,204 | 2/1982 | Ingaki et al. | 350/96.20 X |
| 4,357,072 | 11/1982 | Goodfellow et al. | 350/96.20 |
| 4,385,797 | 5/1983 | Dubois et al. | 350/96.20 |
| 4,403,243 | 9/1983 | Hakamada | 350/96.20 X |
| 4,447,119 | 5/1984 | Beasley | 350/96.18 X |
| 4,474,469 | 10/1984 | Abe | 350/153 X |
| 4,475,788 | 10/1984 | Tomassini et al. | 350/96.18 X |
| 4,612,671 | 9/1986 | Giles | 455/613 X |
| 4,627,687 | 12/1986 | Dorn et al. | 350/96.20 |
| 4,636,030 | 1/1987 | Carter et al. | 350/96.18 |
| 4,640,585 | 2/1987 | Nojri | 350/96.18 X |
| 4,653,847 | 3/1987 | Berg et al. | 350/96.18 X |
| 4,665,529 | 5/1987 | Baer et al. | 350/96.18 X |
| 4,687,290 | 8/1987 | Prussas | 350/96.20 |

FOREIGN PATENT DOCUMENTS

| | | | |
|---|---|---|---|
| 3405805 | 9/1985 | Fed. Rep. of Germany | 35/96.20 |
| 0035369 | 3/1980 | Japan | 350/96.18 |

OTHER PUBLICATIONS

NTZ vol. 38, No. 5, May 1986, pp. 318-320, 322, 323, Berlin, DE A. Kuke, et al., "Verfarhen zur automatischen Montage und Justierung optischer Bausteine".
Patent Abstracts of Japan, vol. 9 No. 20 (P-330) 26th Jan. 1985; JP-A-59 (Nippon Denshin Denwa Kosha) 20-09-1984.
Patent Abstracts of Japan vo. 9 No. 126 (E-318) 31st May 1985; & JP-A-60 12786 (Hitachi Seisakusho K.K.) 23-01-1985.
EP-A-O 152 932 (Siemens) Abstract; Claim 1; Figures 1-3, Published: 28/08/85.

Primary Examiner—John K. Corbin
Assistant Examiner—Loha Ben
Attorney, Agent, or Firm—Gerald K. Kita

[57] ABSTRACT

A lens assembly 26 includes, a lens 27, an optical diaphragm 29 as a convex curved leaf spring, a pedestal 30 spacing the diaphragm 29 from the lens 27, and a holder for mounting the lens assembly 26 in desired position.

11 Claims, 2 Drawing Sheets

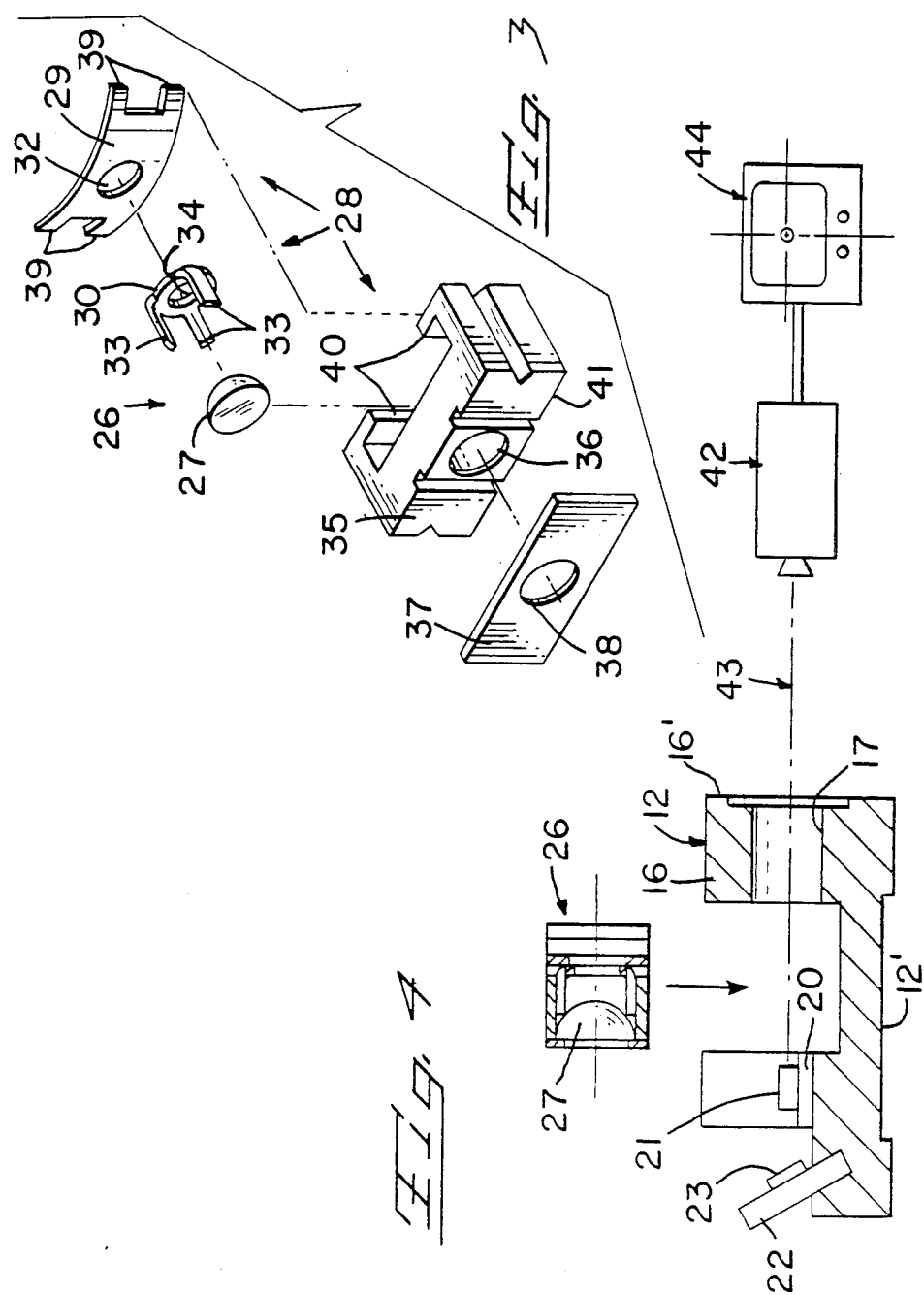

LENS ASSEMBLY FOR OPTICAL COUPLING WITH A SEMICONDUCTOR LASER

This application is a Continuation of application Ser. No. 902,999, filed Sept. 2, 1986, now abandoned.

FIELD OF THE INVENTION

The invention relates to an optical lens and an assembly for holding the lens and for mounting the lens in an optical coupling with a semiconductor laser.

In many applications the emission from the laser must be coupled into an optical fiber. Coupling between an optical fiber and a semiconductor laser is subject to disadvantages and requires a high degree of car in fabrication. A direct attachment of an optical fiber to the laser can be disrupted, because the operating temperature of the laser will fluctuate and cause different dimensional changes respectively in the fiber and the laser. The dimensional changes in response to temperature fluctuation will cause the fiber to change position with respect to the laser or become separated from the laser.

Direct coupling is generally inefficient because of a wide disparity in the dimensions of the guided modes in the laser and in the fiber. This can be overcome by the use of a lens for mode size matching.

An optical coupling is subject to further disadvantages arising from use of a lens to focus optical emission from a laser on an optical fiber. It is difficult to achieve precision optical alignment of the lens and the laser. The fiber can become misaligned due to dimensional changes with temperature fluctuations.

SUMMARY OF THE INVENTION

According to an aspect of the invention, a hemispherical lens is useful for focusing upon a facet of optical emission of a semiconductor laser and for directing the emission along a relatively narrow course established by an optical axis provided along an optical bench that mounts the laser and the lens. Precision alignment of the lens with the optical axis is accomplished by use of a lens assembly that holds the lens and advantageously serves as the means for positioning the lens and for mounting the lens to the optical bench.

The lens assembly is constructed with a holder having an opening in which is mounted the lens. A plano surface of the lens engages a lip. A plate has an aperture aligned with the opening, and the aperture is of less diameter than the opening to form the lip. The lens is held in the opening by an optical diaphragm in the form of a leaf spring convex curved toward the lens. The diaphragm has as diaphragm opening aligned with the axis of the lens. A pedestal having legs engaged against a hemispherical surface of the lens engages and positions the diaphragm spaced from the lens.

According to another aspect of the invention, the lens is assembled with a positioning means including an optical diaphragm, a pedestal against the lens supporting the diaphragm and a holder constructed for attached mounting on the optical bench.

OBJECTS OF THE INVENTION

An object of the invention is to provide a lens assembly suitable for holding and for positioning an opitcal lens in optically coupled relationship with a semiconductor laser.

Another object is to provide a lens assembly in which an optical diaphragm applies spring pressure for holding an optical lens in a holder, and a pedestal maintains the diaphragm spaced from the lens.

Another object is to provide a lens assembly in which an optical lens is precisely aligned with an optical axis by a holder that maintains parts of the assembly together and that mounts the lens in desired precise position.

Other advantages of the invention will be apparent by way of example from a detailed description that follows and from accompanying drawings, which together disclose, by way of example, embodiments of the invention.

DESCRIPTION OF THE DRAWINGS

FIG. 3 is an enlarged perspective view with parts exploded of the lens assembly shown in FIG. 2.

FIG. 4 is a diagrammatic view illustrating a technique for alignment of the semiconductor laser and lens assembly along an optical axis of the optical bench.

FIG. 1 and 4 illustrate an optical bench 12 in the form of an elongated platform 13 fabricated in one piece from heat conductive material. A planar surface 14 of the optical bench extends between a pair of laterally spaced apart identical pillars 15, 15, one of which is shown, and perpendicular to an external datum surface 16' on an end wall 16 having an opening 17 with an axis that is elevated and parallel with respect to the planar surface 14. A groove 18 is recessed angularly in the planar surface 14 near an end 19 opposite the end wall 16. A base 20 carries a semiconductor laser 21, shown schematically. The base 20 is fabricated from a plate of electrically insulative ceramic that has a metal film surface that is bonded to the surface 14 of the optical bench 12. A second base 22 of ceramic is mounted in the recess 18 and projects from the recess 18 at an angle with the planar surface 14. The second base 22 carries a PIN diode 23, shown schematically, in alignment with a rear facet of opitcal emission of the semiconductor laser 21.

According to known principles of operation, the laser 21 produces optical emission from two edges or facets. The PIN diode 23 monitors optical emission from a rear facet and produces an output voltage that is a measure of the emission being monitored. The diode 23 is angular with the axis of emission and is set back sufficiently to avoid reflection of emission reversely along the axis. The output voltage is sampled and used to control a voltage supply circuit, not shown, that supplies current to the laser 21, activating the laser 21 to produce optical emission.

The optical bench 12 has a particular advantage in thermally coupling the laser 21, thereby eliminating the need for heat sink architecture within the semiconductor laser 21 itself. The pillars 15, 15 and the bottom of the optical bench 12 surround the laser 21 to provide a temperature modulator and a heat sink. The optical bench 12 is sufficiently thick to avoid warped distortion by thermal expansion or contraction with fluctuation in the operating temperature of the laser 21. The optical bench 12 is mounted by being soldered by its bottom surface 12'.

Figure 1:
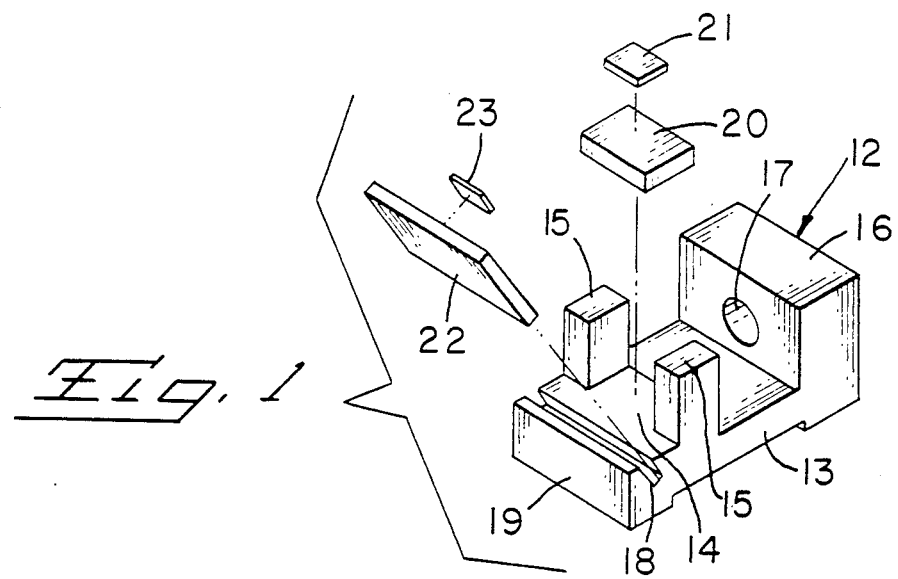
FIG. 1 is an enlarged perspective view with parts exploded to illustrate an optical bench, a semiconductor laser and a monitor of facet emission.
Figure 2:
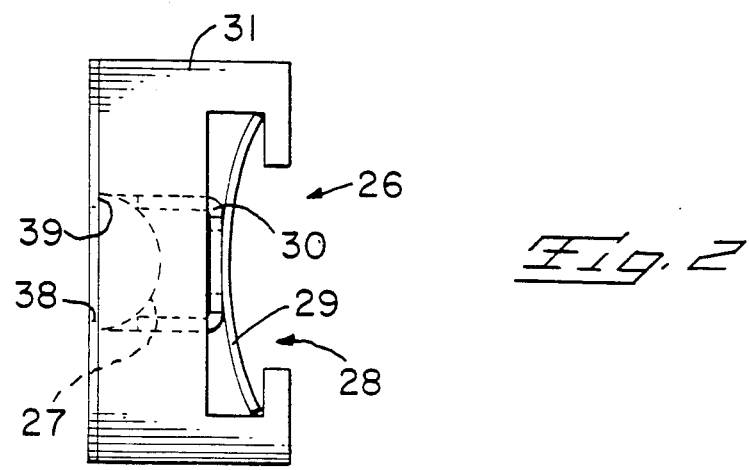
FIG. 2 is an enlarged top view of a lens assembly for the bench shown in FIG. 1.

The optical bench 12 advantageously provides a means for optically coupling the laser 21. With reference to FIGS. 2 and 3, a lens assembly 26 comprises a hemispherical lens 27 having a diameter of about 2 millimeters and fabricated from optical quality silicon and coated with known antireflective optical coating. The lens 27 is assembled with a positioning means 28 including an optical diaphragm 29, a pedestal 30 against the lens 27 and the diaphragm 29 and a holder 31 constructed for attached mounting on the optical bench. The optical diaphragm 29 of metal has a diaphragm aperture 32 aligned with the spherical surface of the lens 27. The pedestal 30 is formed of thin metal with three legs 33, 33, 33 bent out of the plane of the thin metal and radially spaced about a central opening 34 in alignment with the diaphragm aperture 32. The legs 33, 33, 33 engage the spherical surface and hold the diaphragm 29 at a distance from the lens 27.

The lens 27, pedestal 30 and diaphragm 29 are mounted in the lens holder 31 fabricated from copper and plated with nickel and then a layer of gold. The lens holder 31 has a wall 35 with a cylindrical opening 36 receiving the lens 27. The lens holder 31 has a plate 37 bonded by solder, for example, externally to the wall 35. The plate 37 has an opening 38 less than the diameter of the opening 36 to provide a circular lip around the opening 38 against which the plano surface of the lens 27 engages. The diaphragm 29 is convex curved toward the lens 27. Trailing edges 39 of the curved diaphragm 29 seat against a bifurcated back wall 40 of the lens holder 35. The optical axis extends through an opening provided by the bifurcated back wall 40. The curved diaphragm 29 provides a leaf spring that urges the lens 27 to seat against the plate 37. The lens 27 is in fixed position on the lens assembly 26. The lens holder 31 has a planar bottom 41 and is adapted for precise mounting on the optical bench 12.

As shown in FIG. 4, a vidicon 42 sights along an optical axis 43 along the optical bench 12 perpendicular to the datum surface 16' and from the front facet of emission of the laser 21 and through the opening 17 of the optical bench. The laser 21 is temporarily activated to produce emission. The vidicon 42 focus is directed upon the front facet of optical emission and transmits an image of the emission to a CRT monitor 44. The vidicon 42 is of a type which can electronically generate a cross hair and overlay the cross hair at the focus. An image of the cross hair appears on the CRT 44. The lens assembly 26 is then placed on the optical bench 12 and is adjusted to a desired position on the optical bench 12 while maintaining the flat or plano surface of the hemispherical lens 27 parallel to the datum surface 16'. The desired position is established when the lens 27 is focused upon the front facet of emission and the lens 27 transmits the emission precisely along the optical axis 43. The desired position becomes known by viewing the image of the emission on the CRT monitor 44, and watching the image of the emission shift as the lens assembly 26 is adjusted in position on the optical bench 12. When the image of the emission on the CRT monitor 44 coincides with the cross hair image of the CRT monitor 44, the desired position of the lens assembly 26 is attained. The lens assembly 26 is clamped in place. The lens assembly 26 is aligned with zero tilt from direct alignment with the beam of laser emission. The tilt position may be adjusted before the lens assembly 26 is clamped in its final position. The clamped lens assembly 26 is secured by solder to the optical bench 12.

Sometimes it is desirable that a tilt angle be added to the laser beam. This is done by aligning with zero tilt using the vidicon system and then displacing the lens by a predetermined amount to direct the beam to a tilted position from the zero tilt position. The resulting relationship between the tilt angle and the displacement is set by the magnification of the lens. In a typical system, magnification is 5 and a lens displacement of 7/10 of a mil will produce a tilt angle of 3°.

For example, solder alloy, 80 parts An, 20 parts Sn is used to solder the lens holder 35 to the optical bench 12. The laser 21, base 20, diode 23 and base 22 have been secured on the optical bench according to known techniques for high temperature, ceramic to metal bonding that is not disturbed by temperatures related to soldering operations. The specific alloy is exemplary only, since other alloys also are useful in performing the soldering operations. The order of assembly of the parts can be different than described, provided that the parts are assembled according to a procedure such that each soldering operation uses a solder with a melting temperature of at least 15° C. lower than the melting temperature of solder used in a previous soldering operation.

The invention has been disclosed by way of example with reference to the description and drawings. Other examples of the invention are intended to be covered by the spirit and scope of the claims.

We claim:

1. A lens assembly comprising, a holder having a first wall, an opening through the first wall, an optical lens at the opening and facing an optical axis, a pedestal engaged against the lens, an opitcal diaphragm having a diaphragm opening aligned with the optical axis and trailing edges of the diaphragm engaged against a second wall of the holder, the pedestal engaging and positioning the diaphragm spaced from the lens, said lens assembly further comprising a plate secured to the first wall, said plate having an aperture aligned with the opening, the aperture being of less diameter than the diameter of the opening to define a lip.

2. A lens assembly as recited in claim 1, wherein, the diaphragm is leaf spring and is convex curved.

3. A lens assembly as recited in claim 1, wherein, the second wall has an opening through which the optical axis extends.

4. A lens assembly comprising, a holder formed as an integral unit, said holder having first and second walls integrally connected and parallel to each other, said first and second walls being spaced apart from each other and forming a receiving space therebetween, an opening through the first wall along an optical axis, an optical lens disposed within the receiving space between the first and second walls of said holder, said optical lens located adjacent to the opening of the first wall along the optical axis, an optical diaphragm having a diaphragm opening aligned with the optical axis, said optical diaphragm being disposed within said receiving space between said first and second walls, said optical diaphragm acting to restrain said lens against movement along said optical axis, said optical diaphragm including trailing edges engaged against said second wall of said holder, and a pedestal located between and engaging said lens and said diaphragm, said pedestal positioning said diaphragm at a distance from said lens.

5. A lens assembly as recited in claim 4, wherein a plate is secured to the first wall and has an aperture aligned with the opening, and the aperture is of less diameter than the diameter of the opening to define a lip.

6. A lens assembly as recited in claim 4, wherein the diaphragm is a leaf spring and is convex curved.

7. A lens assembly as recited in claim 4, wherein the wall has an opening through which the optical axis extends.

8. A lens assembly as recited in claim 4, wherein the pedestal comprises a platform and legs extending generally parallel to the optical axis, said platform having an aperture through which the optical axis passes.

9. A lens assembly as recited in claim 4 wherein said holder further comprises a mounting surface for mounting said lens assembly on an optical bench.

10. A lens assembly as recited in claim 4 wherein said lens is hemispherical, a planar surface of said lens being adjacent to the opening of the first wall.

11. A lens assembly as recited in claim 4 wherein said second wall is bifurcated.

* * * * *